United States Patent [19]

Stires, III

[11] 4,240,083
[45] Dec. 16, 1980

[54] PROGRAMMABLE STRIP CHART RECORDER

[76] Inventor: John C. Stires, III, Box 988, Rambla de las Flores, Rancho Santa Fe, Calif. 92067

[21] Appl. No.: 946,795

[22] Filed: Sep. 28, 1978

[51] Int. Cl.² .......................................... G01D 15/24
[52] U.S. Cl. .................................... 346/136; 318/696
[58] Field of Search ......................... 346/136; 318/696

[56] References Cited

U.S. PATENT DOCUMENTS

| | | | |
|---|---|---|---|
| 2,945,997 | 7/1960 | Kennedy | 346/136 X |
| 3,351,951 | 11/1967 | Perry | 346/136 X |
| 3,373,329 | 3/1968 | Kaiser | 346/136 X |
| 3,492,553 | 1/1970 | Gordon et al. | 346/136 X |
| 3,887,122 | 6/1975 | Sommeria | 318/696 X |
| 3,991,355 | 11/1976 | Reehil et al. | 318/696 |
| 4,004,672 | 1/1977 | Hirano et al. | 318/696 X |
| 4,074,272 | 2/1978 | Way et al. | 346/136 X |
| 4,074,275 | 2/1978 | Stires | 346/33 TP X |
| 4,100,470 | 7/1978 | Andrews | 346/136 X |
| 4,112,344 | 9/1978 | Klein | 318/696 X |
| 4,112,345 | 9/1978 | Goddijn | 318/696 |

*Primary Examiner*—George H. Miller, Jr.
*Attorney, Agent, or Firm*—Brown & Martin

[57] ABSTRACT

A strip-chart recorder, including a stepper motor for advancing a recording medium from a roll by a predetermined distance upon each step of the motor; and a recording duration controller coupled to the motor for controlling the frequency at which the motor is stepped. The recording duration controller includes a selector system for selectively varying the frequency at which the motor is stepped.

The selector system includes a timing circuit having a given number of outputs for providing timing pulses at different predetermined frequencies at different respective outputs; a like number of frequency selection circuits, each including a switch for selecting one of the predetermined frequencies, and a latch for providing an enabling signal in response to the actuation of the switch; and a logic circuit coupled to the timing means and the frequency selection circuits for providing a control signal for stepping the motor at the predetermined frequency associated with the enabling signal provided by the frequency selection circuit that includes the actuated switch. The latch continues to provide the enabling signal until the latch is reset. The frequency selection circuits are interconnected for causing a given one of the frequency selection circuits to provide its enabling signal whenever none of the switches of any of the frequency selection circuits has been selectively actuated.

4 Claims, 1 Drawing Figure

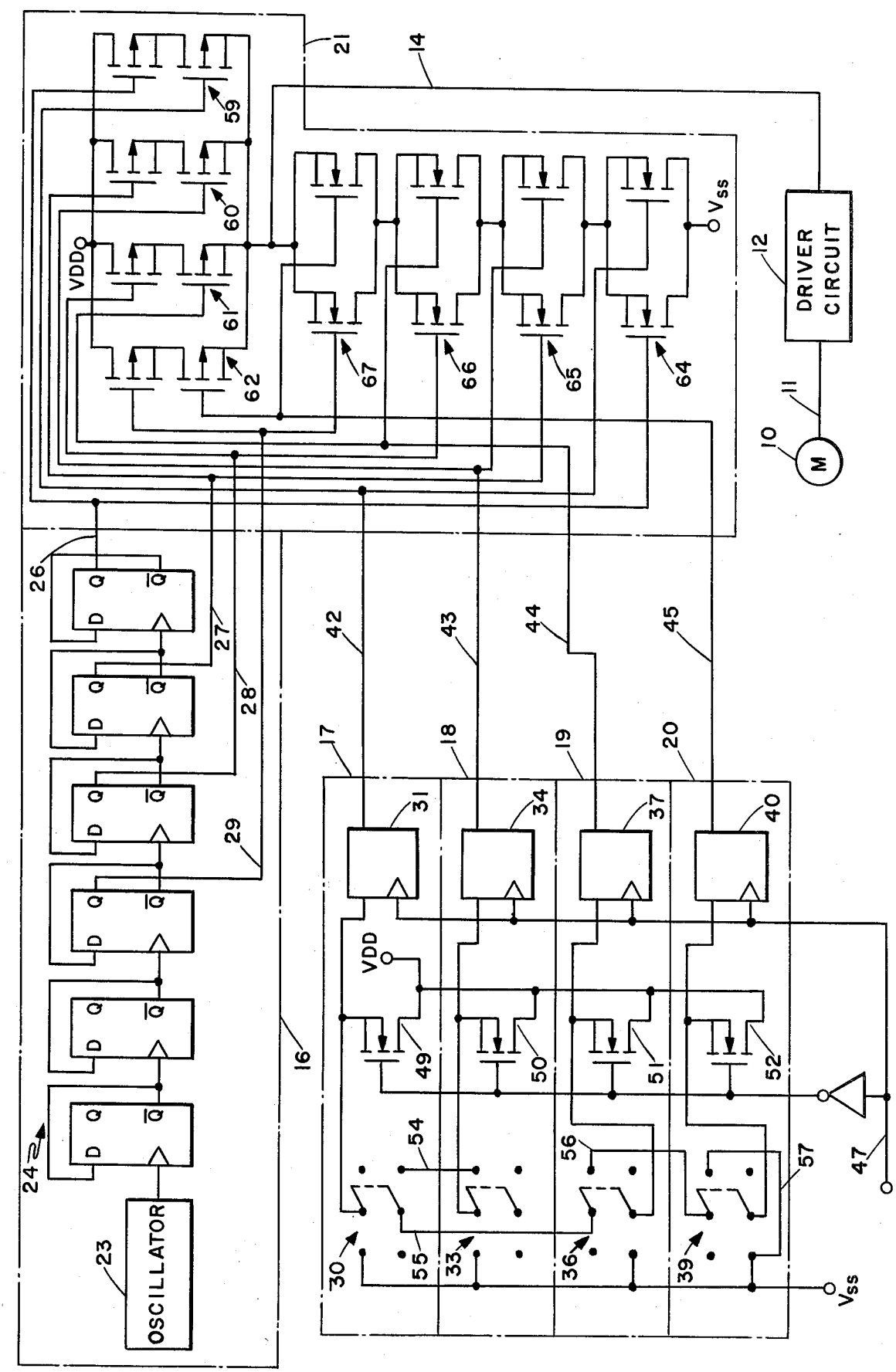

PROGRAMMABLE STRIP CHART RECORDER

BACKGROUND OF THE INVENTION

The present invention generally pertains to strip chart recorders and is particularly directed to programming a strip chart recorder so that it will operate unattended over a predetermined duration.

In a strip chart recorder a recording medium is advanced from a roll by a motor while a stylus produces a record on the recording medium of some variable that is being monitored, such as temperature, for example. The motor typically is either a synchronous motor or a stepper motor actuated in response to a signal from an oscillator. A stepper motor advances the recording medium by a predetermined distance upon each step of the motor, and thereby is preferred for moving the recording medium at a fixed rate of speed in a portable strip chart recorder which is battery-powered.

Portable strip chart recorders are often unattended for extended periods while in use. A typical application is for recording temperature variations in a refrigerated railway car over a period of several days.

A portable strip chart recorder has a capacity for containing a recording medium of a given length. With the motor advancing the recording medium at a fixed rate of speed, the portion of the recording medium that is used depends upon the duration of the recording. Thus a recording of a short duration is compressed into a small portion of the recording medium, with the remainder of the recording medium being unused. This compression of the recording reduces the resolution thereof, whereas if the complete length of the recording medium had been used the resolution would be greatly increased.

SUMMARY OF THE INVENTION

The present invention is a strip chart recorder that can be programmed to operate for a selected duration and to advance the recording medium at a predetermined fixed rate in accordance with the selected duration, such that approximately the full length of the recording medium would be utilized over the selected duration, to thereby provide optimum resolution in the recording.

The strip chart recorder of the present invention includes a stepper motor for advancing a recording medium from a roll by a predetermined distance upon each step of the motor; and a recording duration controller coupled to the motor for controlling the frequency at which the motor is stepped.

The duration of a recording on a given length of recording medium is inversely proportional to the frequency at which the stepper motor is stepped; whereby the maximum duration of a recording on a recording medium of a given length may be selected by selecting the frequency at which the motor is stepped.

In the present invention, the recording duration controller includes a selector system for selectively varying the frequency at which the motor is stepped; and the selector system includes a timing circuit having a given number of outputs for providing timing pulses at different predetermined frequencies at different respective outputs; a like number of frequency selection circuits, each including a switch for selecting one of the predetermined frequencies, and a latch for providing an enabling signal in response to the actuation of the switch; and a logic circuit coupled to the timing circuit and the frequency selection circuits for providing a control signal for stepping the motor at the predetermined frequency associated with the enabling signal provided by the frequency selection circuit that includes the actuated switch.

The latch continues to provide the enabling signal until the latch is reset. Thus, if the actuated switch should become disengaged while the strip chart recorder is in use, the motor will continue to be stepped at the selected frequency associated with the actuated switch for the remainder of the corresponding duration.

The frequency selection circuits are interconnected for causing a given one of the frequency selection circuits to provide its enabling signal whenever none of the switches of any of the frequency selection circuits has been selectively actuated. Thus if the strip chart recorder is turned on and the operator fails to actuate any of the switches in the given number of frequency selection circuits, the motor nevertheless will be stepped at the predetermined frequency and for the corresponding duration associated with the given frequency selection circuit.

BRIEF DESCRIPTION OF THE DRAWING

The FIGURE of the drawing is a circuit diagram of the present invention.

DESCRIPTION OF THE PREFERRED EMBODIMENT

The stepper motor 10 advances a recording medium (not shown) from a roll by a predetermined distance each time it receives a pulse on line 11 from a driver circuit 12. The driver circuit 12 provides a pulse of sufficient power and duration each time the driver circuit 12 is enabled in response to a control signal provided on line 14 from a recording duration controller. The recording duration controller includes a timing circuit 16, a plurality of frequency selection circuits 17, 18, 19, 20 and a logic circuit 21.

The timing circuit 21 includes an oscillator 23 and a frequency divider 24 that provides timing pulses on output lines 26, 27, 28, 29 at different predetermined frequencies. In the preferred embodiment, which is designed for enabling the operator of the strip chart recorder to select between maximum recording durations of 32 days, 16 days, 8 days and 4 days for a recording medium that is 24 inches long and is advanced by an average increment of 0.002 inches upon each step of the motor 10, the frequencies of the timing pulses provided on output lines 26, 27, 28 and 29 are respectively 1 pulse per 240 seconds, 1 pulse per 120 seconds, 1 pulse per 60 seconds, and 1 pulse per 30 seconds. Accordingly output lines 26, 27, 28 and 29 are referred to as the 32 day, 16 day, 8 day and 4 day output lines respectively. The motor rotates 0.36 degrees upon each step.

There are four frequency selection circuits 17, 18, 19, 20 for selecting which timing pulse frequency corresponding to one of the recording durations of 32, 16, 8 and 4 days respectively, that the motor is to be stepped at. The frequency selection circuit 17 corresponding to a 32 day duration includes a double-pole double-throw switch 30 and a "D" latch 31. The frequency selection circuit 18 corresponding to a 16 day duration includes a double-pole double-throw switch 33 and a "D" latch 34. The frequency selection circuit 19 corresponding to an 8 day duration includes a double-pole double-throw switch 36 and a "D" latch 37. The frequency selection circuit 20 corresponding to a 4 day duration includes a double-pole double-throw switch 39 and a "D" latch 40. Each of the switches 30, 33, 36, 39 is a push button switch that is normally spring biased in a first position as shown in the drawing. When the button is pushed the switch is locked in a second position corresponding to the left-hand switch position in the drawing.

The selection of one of the predetermined frequencies corresponding to one of the maximum desired recording durations is accomplished by pushing the corresponding push button switch 30, 33, 36, 39, to actuate the same. When the switch is actuated, a low level (LOW) logic signal corresponding to $V_{SS}$ is provided at the "D" input of the latch 31, 34, 37, or 40 to which the switch is connected, thereby resulting in a LOW enabling signal being provided at the Q output of the latch on line 42, 43, 44 or 45 respectively whenever the latch is clocked in response to a clocking signal provided on line 47. The clocking signal on line 47 also gates the FET's 49, 50, 51 and 52 to cause a high level (HIGH) logic signal corresponding to $V_{DD}$ to be provided to the "D" inputs of the latches 31, 34, 37, 40 that are not connected to a switch 17, 18, 19, 20 that has been actuated. As a result a HIGH inhibiting signal is provided on the lines 42, 43, 44, 45 from the Q outputs of the latches connected to the switches that have not been actuated. The enabling or inhibiting signals provided on lines 42, 43, 44, 45 from the Q outputs of the latches 31, 34, 37, 40 are continued until the latches are again reset in response to another clocking signal on line 47. Thus if the actuated switch should become unlocked and be returned to its original position (as shown in the drawing) before the trip is completed, the strip chart recorder will continue to operate at the frequency, and for the corresponding duration, originally selected.

The clocking signal is provided on line 47 when power is first provided to the circuit. Thus the selected switch 17, 18, 19, 20 must be actuated before power is provided to the circuit. However, if none of the switches 17, 18, 19, 20 are actuated by selectively pushing one of the switches, then the switch 33 in the "16 day" frequency selection circuit 18 is automatically actuated by reason of the interconnection between the switches 30, 33, 36 and 39, wherein the "D" input to the latch 34 is connected to $V_{ss}$ by a series circuit which extends through the switch 33, line 54, switch 30, line 55, switch 36, line 56, switch 39 and line 57 whenever all of the switches are in the positions shown in the drawing. Whenever the push button for any of these switches is pushed to selectively actuate that switch, the series circuit is broken and the $V_{ss}$ signal is removed from the "D" input of latch 34, unless, of course, it is switch 33 that is selectively actuated.

The logic circuit 21 receives the timing pulses from the 32 day, 16 day, 8 day and 4 day output lines 26, 27, 28 and 29 respectively, and also the enabling and inhibiting signals provided on lines 42, 43, 44 and 45 from the frequency selection circuits 31, 34, 37 and 40 respectively. The logic circuit 21 contains four NOR gates 59, 60, 61 and 62 and four series connected NAND gates 64, 65, 66 and 67.

The NOR gate 59 responds to the timing pulses on the 32 day output line 26 and the signal on the line 42 from the corresponding frequency selection circuit 17. The NAND gate 64 also responds to the timing pulses and signal on lines 26 and 42 respectively.

The NOR gate 60 responds to the timing pulses on the 16 day output line 27 and the signal on line 43 from the corresponding frequency selection circuit 18. The NAND gate 65 also responds to the timing pulses and signal on lines 27 and 43 respectively.

The NOR gate 61 responds to the timing pulses on the 8 day output line 28 and the signal on the line 44 from the corresponding frequency selection circuit 19. The NAND gate 66 also responds to the timing pulses and signal on lines 28 and 45 respectively.

The NOR gate 62 responds to the timing pulses on the 4 day output line 29 and the signal on the line 45 from the corresponding frequency selection circuit 20. The NAND gate 67 also responds to the timing pulses and signal on lines 29 and 45 respectively.

As an example of the operation of the logic circuit 21, consider the situation when an enabling signal is provided on line 43 from the frequency selection circuit 18 and inhibiting signals are provided on lines 42, 44 and 45 from the other frequency selection circuits 17, 19 and 20. Then, except during the LOW level duration of the timing pulses from the 16 day output line 27, a LOW level control signal is provided on line 14 from the logic circuit 21 to the driver circuit 12. However, during the LOW level duration of each timing pulse on line 27, NAND gate 65 inhibits the LOW level control signal from being provided on line 14, and the NOR gate 60 provides a HIGH level control signal on line 14. As a result the motor 10 is stepped at a frequency corresponding to the 16 day cycle.

I claim:

1. A strip chart recorder, comprising
    a stepper motor for advancing a recording medium from a roll by a predetermined distance upon each step of the motor; and
    a recording duration controller coupled to the motor for controlling the frequency at which the motor is stepped;
    wherein the controller comprises:
    selector means for selectively varying the frequency at which the motor is stepped; and
    wherein the selector means comprises:
    timing means having a given number of outputs for providing timing pulses at different predetermined frequencies at different respective outputs;
    a like number of frequency selection means, each including a switch for selecting one of said predetermined frequencies, and means for providing an enabling signal in response to the actuation of the switch; and
    logic means coupled to the timing means and the given number of frequency selection means for providing a control signal for stepping the motor at the predetermined frequency associated with said enabling signal provided by the frequency selection means that includes said actuated switch.

2. A recorder according to claim 1 wherein the selector means further comprises means for providing a clocking signal upon the selector means first being energized, and
    wherein each frequency selection means comprises a latch for providing said enabling signal in response to said switch actuation and in response to said clocking signal and for continuing to provide said enabling signal during continuous energization of the selector means.

3. A recorder according to claim 2, wherein each frequency selection means further comprises
    a push button switch that is normally spring biased in a first position, and is locked in a second position when the button is pushed to actuate the switch;

whereby if the actuated switch should become unlocked from the second position while the recorder is in use, the motor will continue to be stepped at the selected predetermined frequency associated with said actuated switch.

4. A recorder according to claims 1, 2 or 3, wherein the given number of frequency selection means are interconnected for causing a given one of the frequency selection means to provide its enabling signal whenever none of the switches of any of the frequency selection means has been selectively actuated prior to energization of the selector means.

* * * * *